March 19, 1974  F. RASSBACH ET AL  3,798,301
PROCESS FOR IMPROVING THE SHAPE OF A STICK OF LONGITUDINALLY
SHIRRED ARTIFICIAL SAUSAGE CASING
Filed Dec. 28, 1971

INVENTORS
FELIX RASSBACH
ROLF BÜTTNER
STEPHAN SCHUCK

ATTORNEY 3,798,301
PROCESS FOR IMPROVING THE SHAPE OF A STICK OF LONGITUDINALLY SHIRRED ARTIFICIAL SAUSAGE CASING
Felix Rassbach and Rolf Buttner, Wiesbaden, and Stephan Schuck, Wiesbaden-Frauenstein, Germany, assignors to Kalle Aktiengesellschaft, Wiesbaden-Biebrich, Germany
Filed Dec. 28, 1971, Ser. No. 213,031
Claims priority, application Germany, Dec. 29, 1970,
P 20 64 192.3
Int. Cl. B29c 15/00
U.S. Cl. 264—294
2 Claims

ABSTRACT OF THE DISCLOSURE

A stick of artificial sausage casing of regenerated cellulose or thermoplastic material which has been longitudinally shirred and reinforced by compression is passed through a narrow, round, resiliently expandable passage. The passage is maintained at an elevated temperature and the stick is maintained at a constant length during travel through the passage causing the entire round outer surface of the stick to be smoothed.

---

Figure 1:
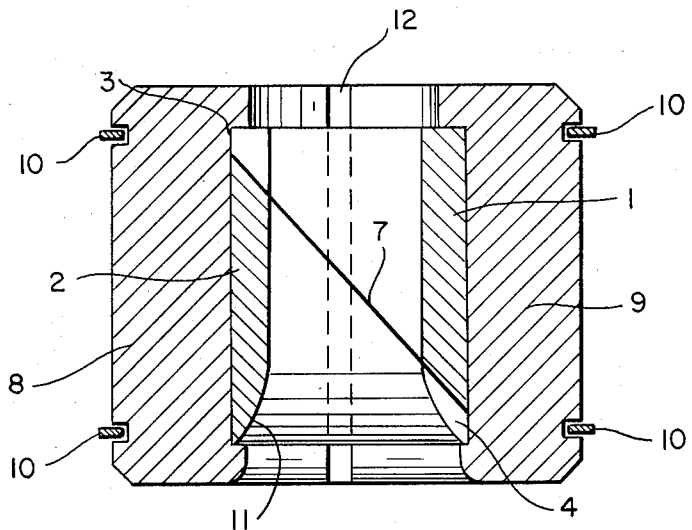

This invention relates to a process for improving the shape of longitudinally shirred sections of artificial sausage casings, i.e., so-called sticks, of regenerated cellulose or thermoplastic material, such as polyamide, polypropylene, or polyethyleneglycol terephthalate, and to an apparatus suitable for the process.

It is known to shirr artificial sausage casings of regenerated cellulose or of synthetic material in the longitudinal direction on a mandrel, so that a section of casing of a given length is shirred to a considerably shorter section. This is then reinforced by lengthwise compression, while still on the mandrel. In this manner, its length is further reduced to half its original length or even less. A section of artificial sausage casing compressed in this manner will be designated as a "stick" for the purposes of the present application. Depending on the way in which they are to be used, more or less stringent standards of quality must be fulfilled by these sticks. In more recent methods of processing, they must meet relatively high requirements with regard to their shape, and in particular their straightness and stiffness, among others.

Many of the known processes for shirring sections of artificial sausage casings produce sticks which do not come up to these high standards of straightness and stiffness. The present invention provides a process by which the straightness and possibly also the stiffness of the sticks can be improved.

Methods for improving the straightness and stiffness of sticks of sausage casing are already known. For this purpose, an additional relative motion around the mandrel has been imparted to the sausage casing while it was advanced along the mandrel for shirring and compression, so that the shirring folds were wound into a helical pattern which has a longer phase than the pattern of the shirring folds and thus is superimposed over the latter. The process was performed in such a manner that the shirred sausage casings were pushed through a narrow passage against a resistance while twisting them. In this manner, the shirred sausage casing was compressed into a stick and, simultaneously, the helical pattern was produced. Apart from the helical pattern formed thereon, the round surface of the stick was smoothed by this process.

The present invention improves the shape, and in particular the straightness, of sticks of artificial sausage casings by means of a simpler process. For solving the problem of the present invention and for improving the shape of a stick consisting of a section of artificial sausage casing of regenerated cellulose or thermoplastic material, which has been longitudinally shared and reinforced by compressing it into a stick, the above described known process is used as a base insofar as the shirred section of artificial sausage casing is passed through a narrow, round, resiliently expandable passage whereby the round outer surface of the shirred section of sausage casing is smoothed. In the process according to the present invention, however, the stick formed by compressing the shirred section of sausage casing is passed through a narrow passage in a manner such that its entire round outer surface is smoothed, the length of the stick is kept constant, and the narrow passage is maintained at an elevated temperature.

While their surfaces are being smoothed, the sticks are positioned on a mandrel, preferably on the same mandrel on which the sections of sausage casing were shirred and compressed into sticks. While their surfaces are being smoothed, the length of the sticks is maintained constant by stops which may be attached to the mandrel.

According to the invention, the entire surface of the stick is flattened and smoothed by the narrow passage. This may be performed, e.g., by passing the stick through a narrow smoothing sleeve which is slotted in the longitudinal direction and split in the cross direction, and the two parts of which are dislocated relative to each other in such a manner that the longitudinal slot of one part of the sleeve is staggered relative to the longitudinal slot of the other half of the sleeve. By longitudinally slotting the smoothing sleeve, it is achieved that the passage is somewhat expanded against the resilience of the sleeve material when a stick is pushed or pulled through the passage, which stick is somewhat thicker than the passage of the smoothing sleeve. By staggering the parts of the sleeve relative to each other, it is achieved that the entire round surface of the stock is smoothed during its passage through the sleeve, in particular also that part of the stick surface is smoothed which during its passage through the first half of the smoothing sleeve passed through the longitudinal slot.

Smoothing of the surface of the sticks is performed by pushing the sticks through the narrow passage without twisting them relative to the mandrel. In this manner, the uppermost peaks of the shirring folds protruding from the round surface of the sticks are bent down. A narrow passage used for smoothing the surface of the sticks in accordance with the invention may have a diameter which is smaller by about 1 to 3 mm., normally by about 2 mm., than the outer diameter of the air-filled sausage casing from which the stick is produced.

During the passage of the sticks, the narrow passage is heated to a temperature which depends on the material of which the sticks are made. For regenerated cellulose sausage casings, temperatures between 80 and 120° C. are preferred. For sticks of thermoplastic material, the temperature may be increased to the melting point of the particular thermoplastic material. When the thermoplastic material is capable of shrinkage at elevated temperatures, however, a temperature is advantageously selected which is low enough to avoid shrinkage of the sausage casing.

Further, the present invention relates to an apparatus for flattening and smoothing the round outer surface of a stick of a shirred and compressed section of artificial sausage casing, which apparatus may be used with advantage for performing the above described inventive process. The apparatus according to the invention is based upon a known smoothing device consisting of a radially resilient smoothing sleeve with a round passage, but according to the present invention, the smoothing sleeve is composed of two longitudinally slotted parts whose slots are staggered relative to each other. The purposes of the longitudinal slotting and staggering of the two halves of the smoothing sleeve have already been explained above. In order to ensure that the resilient expansion of the passage in the smoothing sleeve requires as little force as possible, even in the case of a relatively thick-walled sleeve, at least one groove extending in the longitudinal direction is advantageously cut into the outside of the two parts of the sleeve. Advantageously, the smoothing sleeve is divided into two parts in such a manner that the two parts thereof meet in a plane of division which extends obliquely to the round passage through the sleeve. This has the advantage that the longitudinal slots in the two parts of the sleeve can be made shorter than they would have to be if the plane of division were at right angles to the passage, so that the flattening and smoothing action of smoothing sleeve acts over a longer passage upon the entire round outer surface of a stick passing the passage. The more oblique the plane of division relative to the passage, the shorter the longitudinal slots in the two parts of the sleeve can be made. Thus, it will be most advantageous to manufacture the smoothing sleeve in such a manner that the plane of division between the two parts is as steep as possible and the longitudinal slots are positioned where the sleeve parts have their shortest lengths.

Preferably, the smoothing sleeve consists of heat-resistant plastic material, in particular of polytetrafluoroethylene or of a copolymer of tetrafluoromethylene and hexafluoropropylene.

Figure 2:
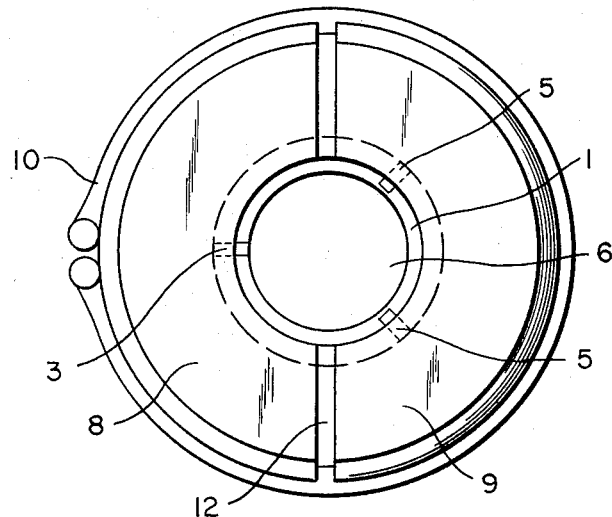

In the following, one apparatus according ot the invention will be described with reference to the accompanying drawing. In the drawing, FIG. 1 shows a longitudinal cross-section through an apparatus according to the invention, and FIG. 2 is a view of the delivery side of the apparatus according to FIG. 1.

The smoothing sleeve of the apparatus shown in the drawing consists of the two parts 1 and 2 which meet each in the plane of division 7. This plane of division extends obliquely to the round passage 6 through the sleeve. In the area of their respective shortest lengths, the sleeve parts 1 and 2 are provided with longitudinal slots 3 and 4 which render them capable of being expanded. For further facilitation of expansion, the two parts of the sleeve are provided with two grooves 5 which are cut from the outside into the walls of sleeve parts 1 and 2 in the longitudinal direction, i.e. parallel to the center line of the passage 6 through the sleeve. (Of the four grooves provided, only two are shown in the drawing, viz. in FIG. 2; they are cut into part 1 of the sleeve.) At its entry end, the passage 6 widens conically in order to catch the stick passing through the sleeve and to smooth it gradually. Flarings 11 are positioned in part 2 of the sleeve.

The two parts 1 and 2 of the sleeve are held together by a housing. The housing is longitudinally divided into two parts 8 and 9. They enclose the smoothing sleeve between them in such a manner that, by approaching each other, they are capable of compressing the smoothing sleeve until its passage reaches its smallest possible cross-section. The two parts of the housing are held together by two resilient circlip rings 10 (Seeger rings) which are inserted in annular grooves surrounding the housing 8–9. Even when they are approached as closely as possible, a small distance 12 is left between the two parts 8 and 9 of the housing.

Preferably, the housing 8–9 consists of metal and is heated when the device is used. Heating may be effected in known manner and need not be explained in detail. Advantageously, an electric heating device is arranged around the housing, which is provided with an adjustable temperature control by means of which the heating current is switched on and off in accordance with the temperature of the housing.

By the process of the invention, the straightness, and in some cases also the stiffness, of sticks consisting of sections of artificial sausage casing may be improved in an easier manner than was hitherto possible. The process has the particular advantage that no twisting between mandrel and sausage casing is necessary. Best results are obtained when the process and the apparatus according to the invention are used for improving sticks of regenerated cellulose sausage casing.

It will be obvious to those skilled in the art that many modifications may be made within the scope of the present invention without departing from the spirit thereof, and the invention includes all such modifications.

We claim:

1. In the process for improving the shape of a stick of artificial sausage casing of regenerated cellulose or thermoplastic material which has been longitudinally shirred and reinforced by compression, the improvement which comprises
    passing the stick through a narrow, round, resiliently expandable passage,
    while maintaining the length of the stick constant, and maintaining the passage at an elevated temperature, whereby the entire round outer surface of the stick is smoothed.

2. A process according to claim 1, in which the diameter of the round passage, when radially compressed to the utmost and capable of resilient expansion, is smaller by 1 to 3 mm. than the diameter of an air-filled sausage casing from which the stick is produced.

References Cited
UNITED STATES PATENTS

| | | | |
|---|---|---|---|
| 3,704,483 | 12/1972 | Urbutis | 99—176 X |
| 3,695,901 | 10/1972 | Winokur | 99—176 |
| 3,461,484 | 8/1969 | Arnold | 99—176 X |

MORRIS O. WOLK, Primary Examiner

S. B. DAVIS, Assistant Examiner

U.S. Cl. X.R.

17—42